(12) United States Patent
Rao et al.

(10) Patent No.: US 6,480,587 B1
(45) Date of Patent: *Nov. 12, 2002

(54) INTELLIGENT KEYBOARD SYSTEM

(76) Inventors: Sanjay K. Rao, 3087 Alexis Dr., Palo Alto, CA (US) 94304; Sunil K. Rao, 3087 Alexis Dr., Palo Alto, CA (US) 94304; Raman K. Rao, 3087 Alexis Dr., Palo Alto, CA (US) 94304

( * ) Notice: Subject to any disclaimer, the term of this patent is extended or adjusted under 35 U.S.C. 154(b) by 0 days.

This patent is subject to a terminal disclaimer.

(21) Appl. No.: 09/642,872

(22) Filed: Aug. 21, 2000

Related U.S. Application Data

(63) Continuation of application No. 09/281,739, filed on Jun. 4, 1999, now Pat. No. 6,169,789, and a continuation-in-part of application No. 08/764,903, filed on Dec. 16, 1999, now abandoned.

(51) Int. Cl.[7] ............................................. H04M 11/00
(52) U.S. Cl. ............................... 379/110.01; 379/90.01
(58) Field of Search ........................ 379/110.01, 90.01, 379/93.05, 93.12, 93.23, 93.37, 52, 100.01, 102.02, 102.03, 419, 420, 428, 429, 441, FOR 132; 345/156; 341/20, 28; 340/310.01

(56) References Cited

U.S. PATENT DOCUMENTS

| | | | |
|---|---|---|---|
| 4,418,333 A | * 11/1983 | Schwarzbach et al. | 340/310.01 |
| 4,503,288 A | * 3/1985 | Kessler | 379/93.23 |
| 4,675,653 A | 6/1987 | Priestley | |
| 4,918,723 A | * 4/1990 | Iggulden et al. | 379/93.12 |
| 5,163,081 A | * 11/1992 | Wycherley et al. | 379/52 |
| 5,195,130 A | 3/1993 | Weiss et al. | |
| 5,212,638 A | * 5/1993 | Bernath | 341/28 |
| 5,379,341 A | 1/1995 | Wan | |
| 5,410,738 A | 4/1995 | Diepstraten et al. | |
| 5,465,401 A | 11/1995 | Thompson | |
| 5,513,242 A | 4/1996 | Mukerjee et al. | |
| 5,517,553 A | 5/1996 | Sato | |
| 5,539,391 A | 7/1996 | Yuen | |
| 5,555,258 A | 9/1996 | Snelling et al. | |
| 5,559,794 A | 9/1996 | Willis et al. | |
| D374,675 S | 10/1996 | Sakai et al. | |
| 5,565,929 A | 10/1996 | Tanaka | |
| 5,566,205 A | 10/1996 | Delfine | |
| 5,577,118 A | 11/1996 | Sasaki et al. | |
| 5,874,939 A | * 2/1999 | Galvin | 345/156 |

FOREIGN PATENT DOCUMENTS

WO   WO92/03884 B1   3/1992

* cited by examiner

Primary Examiner—Wing F. Chan
(74) Attorney, Agent, or Firm—Stephen E. Baldwin

(57) ABSTRACT

This invention generally relates to a system level scheme utilizing an intelligent keyboard, hereafter called an Intellikeyboard, which can operate as a universal compute, command, and control module that interfaces either through wired or wireless means with a number of intelligent appliances, personal computers, work-stations, servers, televisions, printers, smart devices, intelligent devices, telephones, or other devices. The Intellikeyboard has the ability to transmit and receive voice, text, graphics, and other data through either wired or wireless means. The Intellikeyboard may work in tandem with a local or network server to perform standard computing functions, serve as a command and control unit, perform standard telephony functions, transmit and receive electronic mail, voice mail, video, and audio. The invention also anticipates the need for multichannel and sequential/simultaneous tasking and interfaces with numerous intelligent appliances and devices.

7 Claims, 12 Drawing Sheets

| DISPLAY | TELEPHONY MAY INCLUDE BUILT-IN MICROPHONE AND SPEAKERS | INPUT BLOCK<br>RECEIVER BLOCK<br>DECODER BLOCK<br>INPUT BUFFER BLOCK<br>INPUT CONTROLLER BLOCK<br>PROCESSOR BLOCK<br>DATA COMPRESSION BLOCK<br>OUTPUT BUFFER BLOCK<br>OUTPUT CONTROLLER BLOCK<br>ENCODER BLOCK<br>TRANSMISSION BLOCK<br>MEMORY BLOCK<br>DATA STORAGE BLOCK<br>PROGRAMMABLE LOGIC BLOCK | TRANSMIT/RECEIVE FUNCTION OR MODEM WHICH MAY OPERATE THROUGH EITHER WIRED OR WIRELESS MEANS |
|---|---|---|---|

FIGURE 2

SENDING DATA:
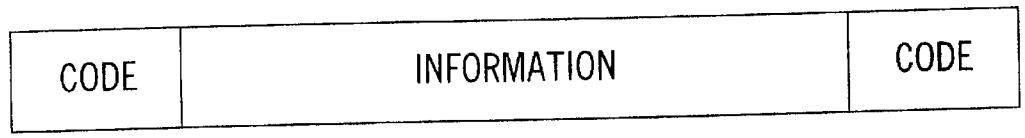
RECEIVING DATA:
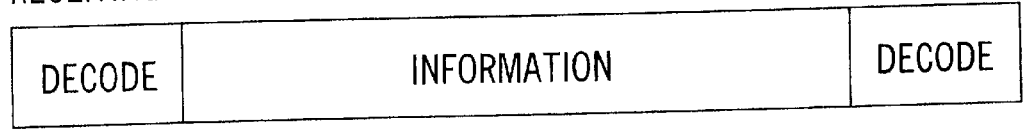
FIGURE 4

INTELLIGENT KEYBOARD SYSTEM

CROSS REFERENCE TO RELATED PATENT APPLICATIONS

The present application is a continuation of application Ser. No. 09/281,739, filed Jun. 4, 1999, entitled Intelligent Keyboard System, now U.S. Pat. No. 6,169,789, issued Jan. 2, 2001, and which is a continuation-in-part of application Ser. No. 08/764,903, filed Dec. 16, 1996 now abandoned entitled "A System Level Scheme To Control Intelligent Appliances Utilizing An Universal Compute Command And Control Keyboard", and which is hereby incorporated by reference.

BACKGROUND OF THE INVENTION

The invention relates generally to an intelligent keyboard system including an intelligent keyboard, hereafter called an Intellikeyboard, which can execute complex tasks previously resident on the personal computer, workstation, server, or a mainframe computer; more particularly, the Intellikeyboard leverages the tremendous power of both the Intranet and the Internet. Intelligent telephony, appliances, devices, and equipment will find increasing use in modem society. There is a need for one single universal, handheld, lightweight, transportable, intelligent device that can compute, command, and control all these intelligent devices.

The Intellikeyboard is lightweight and portable. The Intellikeyboard consists of an optional builtin or external display, a microphone, speaker, high speed transmit/receive device, such as a modem, in addition to a full function keyboard. The Intellikeyboard may have additional input/output ports for plugging in auxiliary devices such as a digital camera, printer, and other devices through either wired or wireless means. The Intellikeyboard has a transmitter, receiver, a digital signal processor(s), other processors, controller, display electronics and audio/video electronics. These functional blocks may be implemented using standard electronic, mechanical, or electromechanical components or custom electronic, mechanical, or electromechanical components by those knowledgeable in the art.

The Intellikeyboard is able to leverage the computing power of the network or local server to process data. The Intellikeyboard serves as a transmit and receive hub. Thus, the Intellikeyboard is able to access a network or local server or an intelligent peripheral device to perform any operation or function.

The Intellikeyboard is able to transmit data inputted by the user to the network or local server or other devices for further processing. A user may input data into the Intellikeyboard by typing on the keyboard, inputting voice or sound through the Intellikeyboard's speaker, touching the screen of the display on the Intellikeyboard, using a mouse that interfaces with the Intellikeyboard, using a pen that interfaces with the Intellikeyboard, or through another method or device that interfaces with the Intellikeyboard. This data and commands generated by the Intellikeyboard may be sent to the local network server or other devices for further processing. The Intellikeyboard is able to retrieve data processed by the local or network server or other devices. The Intellikeyboard can then perform further processing or output this data through the optional display, the speaker, or another device that interfaces with the Intellikeyboard.

Multiple intelligent equipment, intelligent appliances, televisions, printers and other devices can be accessed by a single intelligent keyboard or multiple intelligent keyboards either through a local/network server or directly. Unique addressing identification of each intelligent device, sequencing of instructions, execution of commands wilt be performed via a common set of protocols and procedures that reside on a local or network server or other intelligent devices.

Multiple Intellikeyboards may coexist in an environment to access a common set of intelligent equipment, intelligent appliances, televisions, printers, and other devices. Multiple Intellikeyboards will operate in this common environment without conflict by leveraging a common set of protocols that reside on the local or network server and the Intellikeyboard.

The Intellikeyboard with a built in transmit/receive device, may access standard telephone lines or other communication lines to communicate with other intelligent devices that may be either resident locally or located across an intranet or the Intenet. This two way Communication may be either wired or wireless. The Intellikeyboard has the ability to dial-up and connect with a communication line or another intelligent appliance. The Intellikeyboard may also work in tandem with other modems and transmit/receive devices that may exist in other appliances or work with a central host modem or transmit/receive unit.

The Intellikeyboard combines transmitting and receiving information, performing standard computing functions through use of a network or local server, interacting and commanding many intelligent peripheral devices around the home or office through wired or wireless means, telephony, handwriting recognition, bar code creating, reading and printing; magnetic stripe creating, reading and printing; electronic mail, which may include audio, text/graphics, and video ; mass storage device and display features, video input/output, imaging, audio input/output, voice mail capability, voice synthesis, language translation with text to voice and voice to text capability built in to one multifunction device.

The Intellikeyboard may also serve as a base station or individual station for telephony able to operate with a built in or detachable handset. It can also operate with multiple telephones and handsets. In this mode, the Intellikeyboard can convert voice to text, text to voice, or voice to voice in the same language or in another language. With the large computing/processing power of the local or network server the possibility to conduct live conversation in same or two or more different languages is feasible. Also text transcription of voice conversations and the reverse is possible. The Intellikeyboard may also include the option to have the keys in its keyboard be inscribed in Braille for individuals that are visually impaired. The Intellikeyboard may be limited to some or all of the features described above or may include all the features described above based on the options desired by the user.

In this age of the Intranet and the Internet, there is a trend for the computing power and software protocols to move away from the user location, such as the personal computer, to the local server/network server. The Intellikeyboard may use the local server/network server to perform complex operations, such as language translation. In addition, the Intellikeyboard may have some language translation capability resident in itself via language translation modules that may be easily plugged in and out of the Intellikeyboard.

Currently, keyboards only have the capability to transmit keystrokes to a computing device. However, a keyboard that can perform other complex functions as enumerated above and hereafter in this invention have not been defined. This novel invention for the first time integrates currently available functions such as transmitting keystrokes to a computing device with transmitting and receiving information, performing standard computing functions through use of a network or local server, interacting and commanding many intelligent peripheral devices around the home or office through wired or wireless means, telephony, handwriting recognition, bar code creating, reading and printing; magnetic stripe creating, reading and printing; electronic mail, which may include audio, text/graphics, and video mass storage device and display features, video input/output, imaging, audio input/output, voice mail capability, voice synthesis, language translation, with text to voice and voice to text capability, and other high speed communication features that may be either wired or wireless For example, the Intellikeyboard can interact with various intelligent peripherals and appliances, through either wired or wireless means, to print, scan, fax, copy or perform other functions.

SUMMARY OF THE INVENTION

An object of the invention is to enable the basic Intellikeyboard, which possesses the electronics and computing power to transmit data to and receive data from either a network server (the network server can be a PC) or intelligent peripheral or intelligent appliance through either wired or wireless means, to serve as a transmit and receive hub. Using the computing power resident on the network server a user can perform all standard computing functions from the Intellikeyboard. The Intellikeyboard has a transmitter, receiver, a digital signal processor, controller, and display electronics and audio electronics which are available as chips. These chips may be standard integrated circuits or custom built. There can be a modem or a transmit/receive device built into the Intellikeyboard. This modem or transmit/receive device can operate through either wired or wireless means.

Another object of the invention is to enable the Intellikeyboard to interact and command many intelligent peripheral devices around the home or office through either wired or wireless means and thus serve as a universal keyboard. By using the processing power of the network server, the Intellikeyboard can assign an identification number to each peripheral or appliance. With this unique identification number and the processing capability of the network server, the Intellikeyboard can then control that particular appliance or peripheral. All the appliances and peripherals will subscribe to the same protocols such that they will be able to communicate to each other and execute instructions. The intelligent appliances and Intellikeyboards may operate with a common operating system that may be either proprietary or an industry standard.

Yet another object of the invention is to enable a communication and control scheme of intelligent appliances and peripherals using the Intellikeyboard. The Central multichannel multiplexing transmit/receive device may receive inputs from the local intelligent appliances and route these inputs to the network server/outside world. Conversely, the Central multichannel multiplexing transmit/receive device may receive inputs from the outside world/network server and route these inputs to the local intelligent appliances. The Central multichannel multiplexing transmit/receive device is also able to facilitate communication between the local intelligent appliances. The Central multichannel multiplexing transmit/receive device or functional block may have multiple input and output channels such that sequential/simultaneous addressing and communication with numerous intelligent appliances and communication paths is possible. The Intellikeyboard is one element that would serve as a universal keyboard/command, compute, and control unit within this environment. It is anticipated that the Central multichannel multiplexing transmit/receive device would exist in each home/office environment to facilitate the overall scheme described in this invention. The Central multichannel multiplexing transmit/receive device may be built in multiple configurations. The Central multichannel multiplexing transmit/receive device may be configured with the desired number of input and output channels. The Central multichannel multiplexing modem can be implemented by those knowledgeable in the art utilizing the electronic functional blocks described in this invention. The Central multichannel multiplexing transmit/receive device may work in tandem with an embedded transmit/receive device that may exist in each intelligent appliance. Thus, there may exist within the home/office environment a hierarchy of transmit/receive devices:

1. An embedded transmit/receive device may exist in each intelligent appliance.

This embedded transmit/receive device may have multiple inputs/outputs facilitating communication between other intelligent appliances and the central transmit/receive device or directly with the outside world.

2. A central transmit/receive device that will exist in the home/office environment such that it may communicate with numerous intelligent appliances and the outside world.

3. The ability to convert passive electrical outlets and switches that could communicate within this environment and be controlled by an Intellikeyboard or other means.

4. A universal intelligent keyboard that will facilitate the command, compute and control of all intelligent appliances and systems within the home/office environment.

Another object of the invention is to enable the Intellikeyboard, which has a speaker and microphone to facilitate interaction between voice recognition software resident on the network server and the Intellikeyboard. The Intellikeyboard is also capable of outputting sound. It is also able to convert sound to data that can be transmitted to a network server. By using the voice recognition software resident on the network server, Intellikeyboard can convert text data into voice and broadcast voice through a speaker mechanism.

Another object of the invention is to enable the Intellikeyboard's display to send data to and receive data from the network server. This display is capable of showing text, graphics or other data.

Another object of the invention is to enable the Intellikeyboard to transmit inputs from either the keypad, display or voice inputs (sound) picked up from the microphone to the network server or intelligent peripheral or intelligent appliance for processing (through either wired or wireless means). Thus one may either send data to software resident on the network server or intelligent peripheral or intelligent appliance through the keypad, through voice commands, or through the display by touching the screen.

Another object of the invention is to enable the Intellikeyboard to receive and transmit information through a modem, a telephone line, an ethernet line or other form of data communication. These inputs and outputs are then processed by a network server or local server and are relayed back to Intellikeyboard and/or the display. The Intellikeyboard can use its modem to transmit data to and receive data from a network server or "intelligent" peripheral or appliance through either wired or wireless means. In this scenario, the network server may perform any computation that is necessary. Intelligent peripherals and appliances will interact with the Intellikeyboard through either wired or wireless means.

For example, wireless communication may be achieved through either radio frequency, in which line of sight is not required, or through infrared, in which line of sight is required. For wireless operation, a radio frequency transmit/receive device or functional block can be built into the Intellikeyboard. The radio frequency transmit/receive device or functional block allows the Intellikeyboard, which uses the computing power of the network server, to interface and control other intelligent peripherals or intelligent appliances. The radio frequency modem can be either single or multi-channel. This means that the radio frequency transmit/receive device or functional block which is built into the Intellikeyboard can receive all of its input from the Intellikeyboard or it can receive many different inputs from various intelligent appliances and peripherals simultaneously. The radio frequency may be in any range that is FCC approved including spread spectrum.

Another object of the invention is to enable the Intellikeyboard to be connected to a local area network or wide area network including the Internet, through either wired or wireless means, to receive inputs of text and/or voice and to send outputs of text or voice depending on the user's choice. Voice sent to a network server could be stored as a data file.

Another object of the invention is to enable the Intellikeyboard to work in tandem with a network server to receive text or voice data and process these inputs for audio output. The primary computing power/protocols and software reside on the server.

Voice includes spoken as well as other audio and or audible tones inclusive of music/sound.

Another object of the invention is to enable the Intellikeyboard to have options and attachments added to it. For instance, the Intellikeyboard can have more processing power such that it can perform basic computations and will not have to directly communicate with the network server to perform certain functions. For example, Intellikeyboard can possess more processing power so that it can assign an identification number to various appliances and peripherals, recognize various appliances and peripherals and so that it can assign instructions for these appliances and peripherals to execute. Additionally, other features such as data storage can be added to the Intellikeyboard. A module or storage device can be built into the Intellikeyboard to record and store data and voice. For example, this can be accomplished by using a PCMCIA card. The Intellikeyboard can also be connected to a mouse, CD-ROM, printer, CRT/TV by either wired or wireless means. As an option a scanner may interface with the Intellikeyboard so that documents can then be sent to the network server for further processing.

An object of the invention is to enable a user to use voice commands to access the Internet and at the same time command intelligent peripherals and appliances through either wired or wireless means.

Another object of the invention is to combine transmitting and receiving information, performing standard computing functions through use of a network or local server, interacting, and commanding many intelligent peripheral devices around the home or office through wired or wireless means, telephony, handwriting recognition, bar code creation, reading and printing; magnetic stripe creating, reading and printing; electronic mail, which may include audio, text/graphics, and video; mass storage device and display features, video input/output, imaging, audio input/output, voice mail capability, voice synthesis, language translation with text to voice and voice to text capability, and other high speed communication features that may be either wired or wireless into one device.

Yet another object of the invention is to enable a user to translate voice in one language to text or voice in another language. This can be accomplished either by using language translation modules which fit into the Intellikeyboard or by using the software capabilities of the local or network server. The output can be in audio, display/video format or the Intellikeyboard can command an intelligent peripheral such as a printer to convert this output into hard copy format.

Yet another object of the invention is to enable a user to translate text in one language to text or voice in another language. This can be accomplished by either using language translation modules which fit into the Intellikeyboard or by using the software capabilities of the local or network server. The output can be in audio, display/video format, or the Intellikeyboard can command an intelligent peripheral such as a printer to convert this output into hard copy format.

Yet another object of the invention is to enable users to communicate with and command the Intellikeyboard remotely, through either the Internet or through a data communication line such as a telephone line.

Still another object of the invention is to enable a user to command the Intellikeyboard through voice commands. As an example, a user could dictate a message to the Intellikeyboard in any language.

Yet another object of the invention is to enable the Intellikeyboard to be able to interact with other intelligent peripherals or intelligent appliances. This could involve, for instance, interacting with an intelligent television to output the keystrokes that are typed on the Intellikeyboard.

Yet another object of the invention is to enable the Intellikeyboard to interact with other devices through either wired or wireless means.

Still another object of the Intellikeyboard is to enable the device to work in conjunction with a local or network server to receive text, voice, or other data and process these inputs for either editing, audio, video, and other data output.

A feature of the Intellikeyboard is to use the computing power of the local or network server to perform complex tasks. As an example, a local server may be a personal computer.

Another unique feature of the Intellikeyboard is that it has a built in communication functional block such as a high speed transmit/receive device. This high speed transmit/receive function enables the Intellikeyboard to access the network at very high data rates that are necessary in order to transmit and receive data from other devices or from the network. The ability to transmit/receive may reside within the keyboard or be external to it. This access to the the Internet, the Intranet, cable network, wireless network, or other networks may be via wired or wireless means. As an example, the Intellikeyboard may receive/transmit through a wireless satellite network. It is anticipated that many intelligent appliances will have a common transmit/receive function that would operate under common industry standards and protocols. These standards would apply both for the hardware and the software implementation. These transmit/receive functional blocks will be part of the hardware of many intelligent appliances/devices.

Another unique feature of the Intellikeyboard is that it could serve as the base station or as a handset for telephony with the ability to operate with multiple telephone handsets. This will enable the user to transmit and receive using voice and selectively display as needed. The telephony may be either wired or wireless.

In accordance with another feature of the invention the Intellikeyboard may have options and other devices added on to it. For example, extra data/mass storage devices can interact with the Intellikeyboard. This will allow local archival of confidential and sensitive messages and data and at the same time will enable the user to access certain types of data since it is resident locally rather than on the network.

Another unique feature of the Intellikeyboard is that it can take inputs of written word or spoken word and output a synthesized voice through its speakers. The database that contains the intonation and phonetic character of the voice can reside either in specialized modules which fit into the Intellikeyboard, or on the local or network server, or on the Intellikeyboard itself. Various synthesized voices can be selected ranging from your own to someone else's. As an example, you could record some selected sounds and it would recognize your voice patterns and synthesize it. This allows text to be outputted as speech in your own voice or another voice.

Another object of the invention is to enable the Intellikeyboard to capture images from books, blackboards, white boards, paper easel boards, and other displays to either print, process, transmit, or store for future use. As an example, the Intellikeyboard may have an image capture capability through a digital camera. The image capture capability may either be built in, or be in an optional attachment or be part of a peripheral device that works in tandem with the Intellikeyboard. In this scenario, the Intellikeyboard can digitize the text/drawings or other information displayed on a book, sheet of paper, blackboard, white board, paper easel, or other forms of display for archival, further processing, or transmission via a network to other locations/devices.

Another object of the invention is to enable the Intellikeyboard to use its digital camera, which can be an attachment or can be built into the Intel likeyboard, to digitize an image. This image can then be converted to either voice or text. As an example, if the digital camera took a digitized image of a page in a book which might be inconvenient to scan in through a page-feed scanner as opposed to a flat-bed scanner, it could then convert this image into text and store this as a text document or process this information further or it could convert the image into voice for further processing or output through the speakers.

Another object of the invention is to automatically add subtitles/text to a video clip, which may be displayed continuously or frame by frame. The Intellikeyboard converts the voice from the video clip into text and is able to display this text/subtitle on a CRT or display in any or multiple languages. As an example, this option would be of great benefit to individuals who are hearing impaired. Another example of the benefit of this textual display is the ability for those watching a movie in one language to hear the sound in that language but view the text/subtitles on the screen in a different language.

Another object of the invention is to recognize alpha-numeric text to create bar codes. The Intellikeyboard can also read bar codes to create alpha-numeric text. With a bar code reader attachment which may be wired or wireless the Intellikeyboard serves as a vehicle either to print bar code labels or to store the digitized bar code information for further processing.

Another object of the invention is to enable the Intellikeyboard to serve as a point of sale terminal that can read magnetically coated information from credit cards. In this configuration, the Intellikeyboard will have a built in feature or an external attachment where a credit card can be swiped across a reader that would be able to read magnetically coated information from the credit card for transmission, verification, transaction, and confirmation. The Intellikeyboard as an example may be used in stores to conduct transactions. By interacting, and commanding an intelligent printer, the Intellikeyboard would be able to print. It is also anticipated that the Intellikeyboard would be able to facilitate home banking, home shopping via this feature with the ability to provide printed receipts or storage of relevant information on a local and/or network server.

Another object of the invention is to enable a user to input handwritten text in any specific language and have the Intellikeyboard output text in the same or another language in a standardized format in any font for either display, transmission, or further processing. The Intellikeyboard can perform the reverse operation of converting standardized text in any specific language to handwritten text in the same or a different language. It is anticipated that independent third parties would develop handwriting pattern recognition algorithms based on sampling and digitizing various types of handwriting patterns in a specific language with the object of creating a lookup table that would provide a corresponding standardized textual equivalent. These types of handwriting recognition databases may be created for English and all other languages with a textual equivalent in each language. Cross-linking of these different handwriting language databases allows for language translation of handwritten text into the same language or another language's textual equivalent. As a result, it is also possible to have the conversion of handwritten text in one language to handwritten text in another language. If the user desires to use his own handwriting for output, the user can input a sample document with his handwriting on it to the Intellikeyboard. The Intellikeyboard can then store the handwriting pattern and various handwritten letters of the alphabet in a look-up table or database. The Intellikeyboard can use this database and optical character recognition/handwriting pattern recognition algorithms to output a text document in the user's handwriting. It is also possible to convert handwritten text into voice and the reverse process of voice into handwritten text in the same or a different language. The software, protocols, handwriting recognition algorithms and databases to perform this function may reside in the Intellikeyboard or on a local or network server which the Intellikeyboard interacts with.

Another object of the invention is to provide complete portability such that the Intellikeyboard can be used locally or globally. An Intellikeyboard may be personalized and used anywhere in the world by plugging into a communication line to access various intelligent appliances and devices.

Another object of the invention is to enable handheld personal computers and other similar portable or desktop devices to incorporate some or all of the features claimed for the Intellikeyboard.

Another object of the invention is that an embedded multichannel transmit/receive device or functional device may be incorporated into various intelligent appliances including a handheld PC. The embedded transmit/receive function allows the communication between various intelligent appliances and is configured to work in tandem with a Central multichannel multiplexing multichannel transmit/receive device.

Another object of the invention is that a Central multichannel multiplexing multichannel transmit/receive device will be an integral part of a local or wide area network working as a central controller or communications server. In this capacity, it is able to control a number of intelligent client appliances within its local sphere of control or RF range. In this capacity as a communications server this unit unlike a PC or other standard servers may not have full range of computing capabilities but a limited set that enables it to serve in sequencing and scheduling the transmt/receive functions.

Another object of the invention is to define a transmit/receive functional block that can be single input or multiple input with either a single or multiple outputs that may be accessed sequentially or simultaneously. Conceptually the transmit/receive functional block may be executed in two forms: an embedded transmit/receive function that would reside in an intelligent appliance or device and secondly as a central multichannel multiplexing unit that could work in association with a number of embedded transmit/receivers, to schedule and sequence communication traffic.

Another object of the invention is that the embedded transmit/receive function and the central multichannel multiplexing transmit/receive functional block concept can be executed at a printed circuit board level or as a multichip single package or as a single chip monolithic IC solution. This solution can be an integral part of every intelligent appliance, personal computer, servers, and other devices to enable intelligent appliances to communicate within a local or wide area network or across the Internet.

Another object of the invention is to enable the ubiquitous wall electrical sockets, switches, sensors, and other similar devices to be turned into intelligent units capable of being controlled by the Intellikeyboard and functioning smartly within an intelligent local or wide area network. This is accomplished by an embedded radio frequency controller. The functional block level concept for executing this radio frequency controller as a single chip monolithic IC solution is outlined.

The invention and objects and features thereof will be more readily apparent from the following detailed description and appended claims when taken with the drawings.

BRIEF DESCRIPTION OF THE DRAWING

FIG. 2 is a detailed block diagram of the Intellikeyboard that highlights the display, telephony, transmit/receive function, and other specialized functions which can be implemented as hard ware/software by those knowledgeable in the art and reduced to practice.

FIG. 4 is a simplified block diagram that would allow the coding of information, transmitted by an intelligent device such that this information received by another device can be decoded and identified to its unique source from which the data was transmitted.

The figure is for illustrative purposes and the number of inputs and outputs is not to be construed as limited by the examples shown in the figures. In addition, the feature of programmation can be provided for added flexibility. Further, each of the input/output channels could be hardwired designed or software programmable to interface with various types of input/output data communication lines.

Figure 7:
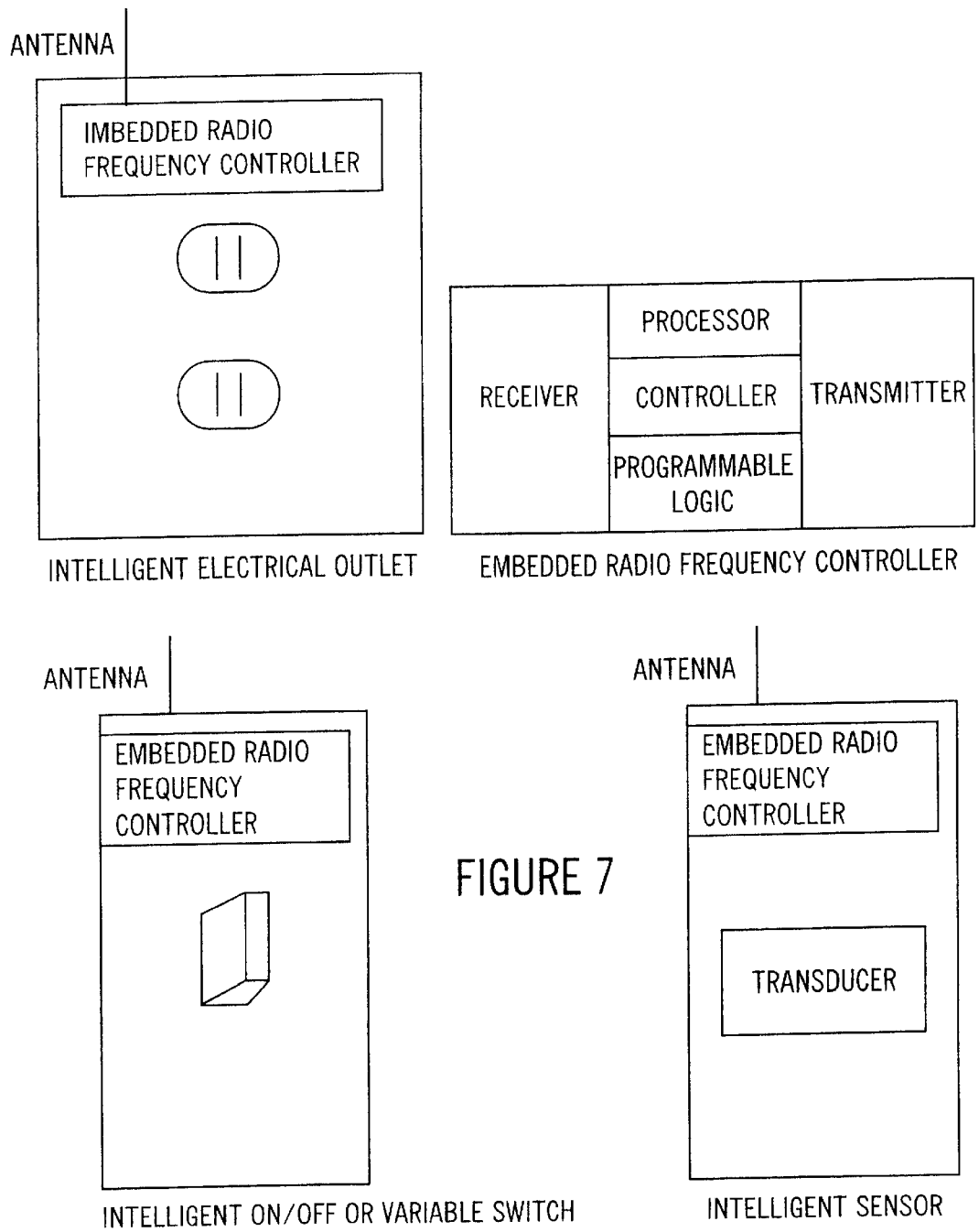

FIG. 7 shows how the ubiquitous electrical outlet and the electrical switch could be made to be intelligent by having an embedded radio frequency controller. The embedded radio frequency controller allows the Intellikeyboard and or/other intelligent appliances to efficiently and intelligently interact with the electrical outlet and the electrical switch. The electrical wiring may serve as an antenna. By extension this concept may be applied to other appliances that are either active or passive. In addition, the existing base of electrical outlets/switches could have an intelligent plug-in module to turn these hitherto passive outlets into active intelligent outlets/switches. The imbedded RF controller may have programmable features built in to provide added options.

FIGS. 8–12 show additional block diagrams of an intelligent keyboard system according to the present invention.

DETAILED DESCRIPTION OF ILLUSTRATIVE EMBODIMENTS

Figure 1:
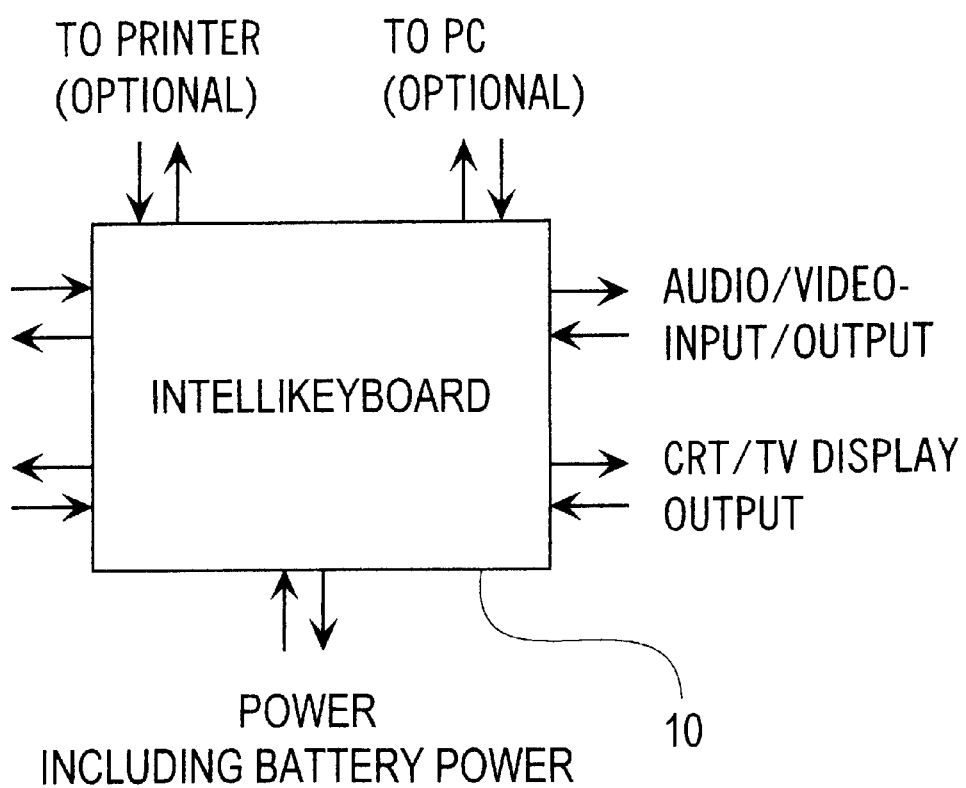
FIG. 1 is a system level input/output block diagram and configuration of the Intellikeyboard. In addition to its normal keyboard, display, and other features the Intellikeyboard has the ability to interface with a telephone line, or other network and data communication paths, either by wired or by wireless or other network and data communication paths. The Intellikeyboard may have a built in imbedded transmit/receive function or may interface with an external transmit/receive device either of which may be wired or wireless. The input/output functions of the Intellikeyboard described in this figure can be executed by those knowledgeable in the art and reduced to actual practice.

Referring now to FIG. 1, the Intellikeyboard may have multiple inputs and outputs which may be connected through either wired or wireless means. Additional inputs and outputs may be added as needed to make the Intellikeyboard a multifunction universal keyboard. The added features may be external or built-in.

Referring to FIG. 1, the Intellikeyboard may have an optional built in scanner mechanism such that the Intellikeyboard can be used as a handheld scanner. This built-in scan mechanism may be arranged along any edge of the Intellikeyboard to allow for page scanning, or other document scanning by dragging or sweeping the Intellikeyboard edgewiseC, across the document. The scanned images may be displayed on a built-in screen of the Intellikeyboard or transmitted for further processing/display on other intelligent devices.

Referring, to FIG. 1, the Intellikeyboard may also have a built-in CD-ROM capability with insertion/removal of CD along any edge of the Intellikeyboard. The compact disc diameter may vary and may be customized to a smaller diameter to fit into the Intellikeyboard and meet any size constraints. Similarly, along another edge of the Intellikeyboard it is possible to have a slot for a floppy disk drive or other ports.

Referring to FIG. 1, the Intellikeyboard may have a built-in microphone and speaker to facilitate speaking directly into the Intellikeyboard as we normally do into a telephone handset and also listening to its sound output. In addition, the Intellikeyboard may have optional attachments to provide other standard telephony features.

Referring now to FIG. 2, the Intellikeyboard consists of a keyboard, a display, a microphone, a speaker, telephony, transmit/receive device, with optional input/output ports. The telephony feature may work either with an intelligent telephone/base station or with a local or network server. Data may be inputted via the keyboard, a touch screen display, or through voice. Processing may be performed within the Intellikeyboard or by the local or network server or other intelligent devices.

Figure 3:
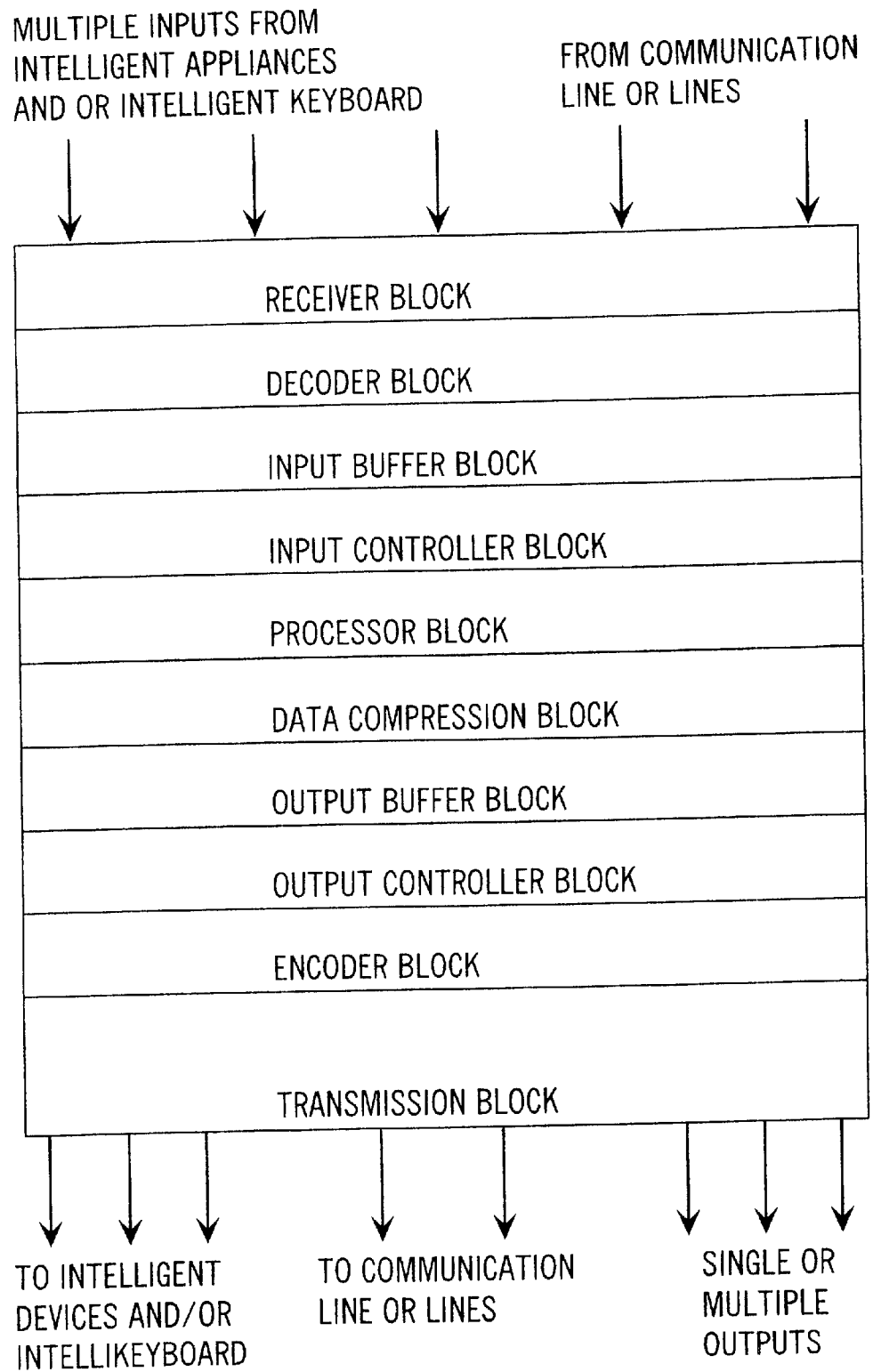
FIG. 3 describes one of the possible schemes and detailed functional blocks that would be part of an embedded transmit/receive function. It is anticipated that many intelligent appliances will have an imbedded transmit/receive function that complies with established industry standard hardware and software protocols that are expected to emerge. The figure shows multiple inputs and multiple outputs that would allow each intelligent appliance to sequentially/simultaneously interface with more than one intelligent appliance or Intellikeyboard. The Intellikeyboard itself is an intelligent device that would have the same imbedded transmit/receive function.

Referring now to FIG. 3, which describes the Central multichannel multiplexing transmit/receive device, the electronics of the Central multichannel multiplexing, transmit/receive device consists of an input block, receiver block, decoder block, input buffer block, input controller block, processor block, data compression block, output buffer block, output controller block, encoder block, and transmission block. Shown in this figure are multiple inputs from various intelligent appliances and/or the intelligent keyboard. The input block consists of multiple channels that will route the data to the receiver. The receiver electronics is capable of receiving data and identifying the source of each data packet. The receiver block is capable of receiving inputs simultaneously or sequentially from various sources. The data received from the receiver block may be in an encoded form in which case the decoder block decodes the data for further processing. Simultaneous and/or sequential data packets from multiple sources are stored and queued for further processing in the input buffer block. The input controller block decides which packet of information needs to be processed next and sends the appropriate packet of data for further processing by the processor block. After the data is processed by the processor, it is now ready for transmission. However, to achieve high speed transmission the data compression block compresses the data. The data is now stored in the output buffer block awaiting specific instructions by the output controller block. The encoder block encodes the packet of data such that it reaches the unique appliance or device for which it is intended. The transmission block transmits the data in sequence to the intended appliance or device or for further processing via a standard communication line or a RF data path. Those knowledgeable in the art can implement each of the specific functional blocks utilizing standard electronic components or custom components. These components may be configured to perform parallel processing for various data streams. For example, with a four channel capabilities desired four separate processor components may be used or a four channel monolithic processor specifically designed for this purpose may be used.

Referring now to FIG. 4, this figure shows a simplified block diagram by which an identifying string could be attached to real data. This identifying string will precede actual data transmission and will also be sent after the actual data transmission. In other words, packets of real data are embedded in between two identifying strings. These identifying strings uniquely define the source of the data and the destination of the data.

Thus the intelligent appliance sending the data is uniquely identified and the intelligent appliance receiving the data is uniquely identified. The periodicity at which the identifying strings could be appended to actual data will depend on the level of accuracy, security, and the speed of transmission desired. The actual data may be encrypted. These protocols ensure that the correct intelligent appliance is being addressed at all times. In addition, the user may be able to set a unique identification number and addressing sequence of his choice for each intelligent appliance or device.

Figure 5:
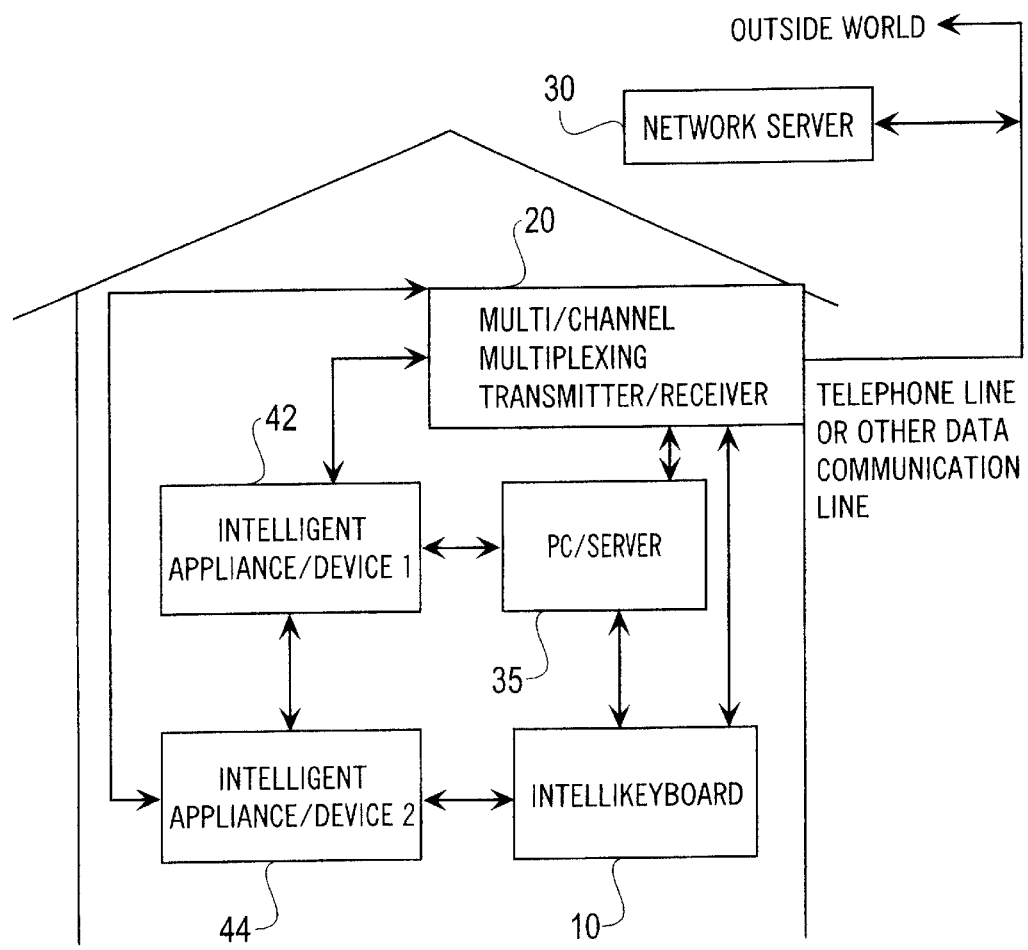
FIG. 5 shows a scheme of how multiple intelligent devices and the Intellikeyboard coexist in an office/home environment with each other, the PC/server, the network server, and the outside world. This drawing shows a central multi-channel multiplexing transmit/receive device that is able to receive inputs from various intelligent appliances and channel the routing and transmission for efficient communication between various intelligent appliances.

Referring now to FIG. 5, this figure shows a system level scheme that describes the various communication and data paths between various intelligent appliances, the central multichannel multiplexing transmit/receive device, the local or network server,and the Intellikeyboard. When sending data, intelligent appliances and devices are expected to subscribe to common, industry standard protocols that establish the identity of each intelligent appliance/device and the unique way to address each intelligent appliance/device. These protocols ensure that the correct intelligent appliance/device is being addressed at all times. In addition, the user may be able to set a unique identification number and addressing sequence of their choice for each intelligent appliance/device.

The Central multichannel multiplexing transmit/receive device may receive inputs from the local intelligent appliances and route these inputs to the network server/outside world. Conversely, the Central multichannel multiplexing transmit/receive device may receive inputs from the outside world/network server and route these inputs to the local intelligent appliances. The Central multichannel multiplexing transmit/receive device is also able to facilitate communication between the local intelligent appliances. The Central multichannel multiplexing transmit/receive may have multiple input and output channels such that sequential and simultaneous addressing and communication with numerous intelligent appliances and communication paths is possible.

The Intellikeyboard is one element that would serve as a universal keyboard/command and control unit within this environment. It is anticipated that the Central multichannel multiplexing transmit/receive device would exist in each home/office environment to facilitate the overall scheme described in this invention. The Central multichannel multiplexing transmit/receive device may be built in multiple configurations. The Central multichannel multiplexing transmit/receive device may be configured with the desired number of input and output channels. The Central multichannel multiplexing transmitter/receiver can be implemented by those knowledgeable in the art utilizing the electronic functional blocks described in this invention.

The Central multichannel multiplexing transmit/receive device may work in tandem with an embedded transmit/receive device that may exist in each intelligent appliance. Thus, there exists within the home/office environment a hierarchy of transmit/receive devices:

1. An embedded transmit/receive device may exist in each intelligent appliance. This embedded transmit/receive device may have multiple inputs/outputs facilitating communication between other intelligent appliances and the central transmit/receive device or directly with the outside world.

2. A central multichannel multiplexing transmit/receive device that will exist in the home/office environment such that it may communicate with numerous intelligent appliances and the outside world.

3. The ability to convert passive electrical outlets and switches that could communicate within this environment and be controlled by an Intellikeyboard or other means.

4. A universal intelligent keyboard that will facilitate the command, compute and control of all intelligent appliances and systems within the home/office environment.

Figure 6:
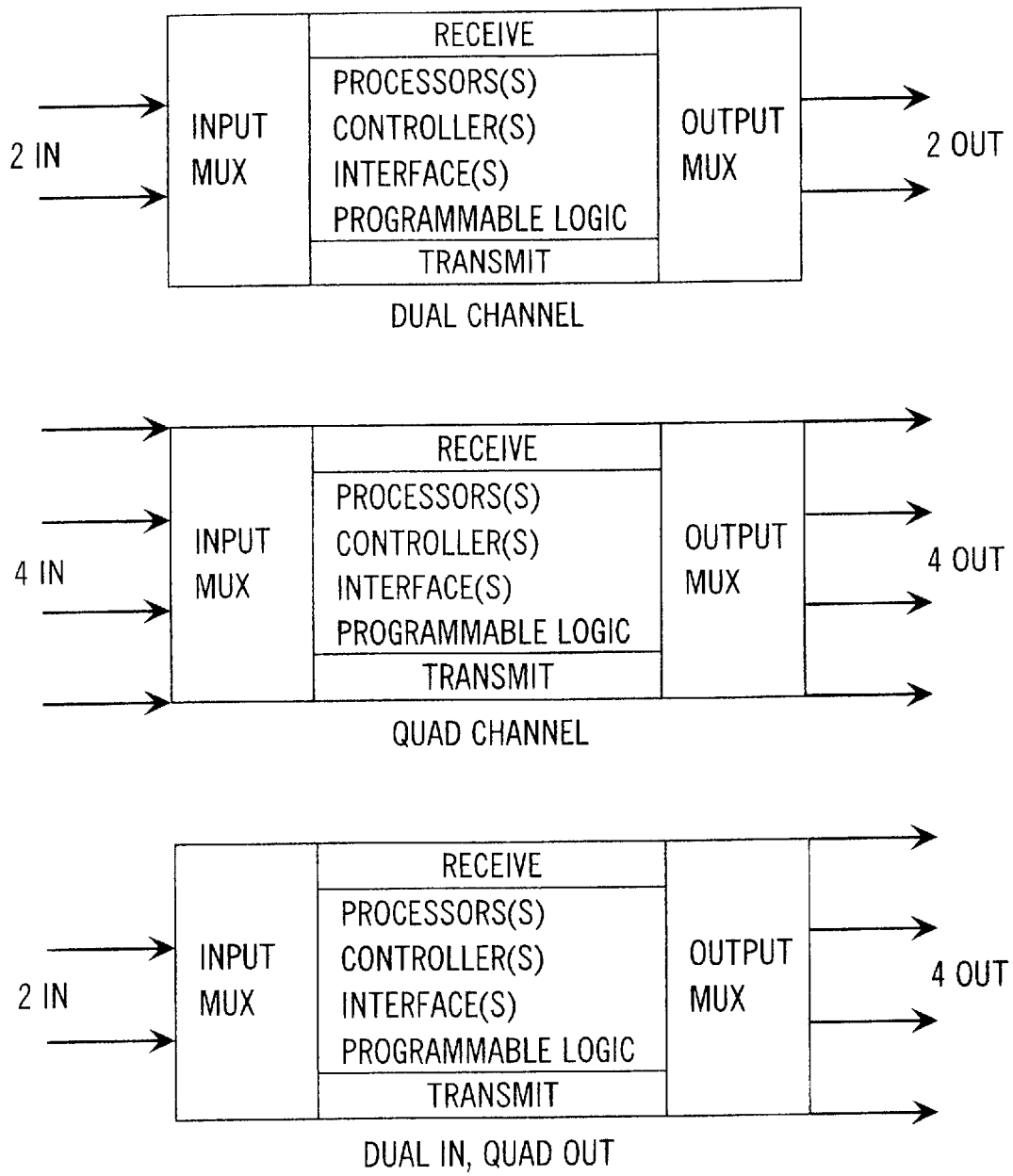
FIG. 6 shows how the central multi-channel multiplexing transmit/receive function could be implemented as a hardware system in a box or as an integrated system level silicon solution in the form of an single chip/multi-chip single packaged integrated circuit. Many combinations of inputs and outputs are possible as shown in the figure.

Referring now to FIG. 6, which describes a multichannel multiplexing transmit/receive device, the transmit/receive controller electronics block diagram can be implemented by those skilled in the art with either standard or custom electronics. The entire controller electronics may be a single chip integrated circuit. It is anticipated that all intelligent appliances would utilize this block diagram as a universal and requisite embedded feature. This embedded transmit/receive function may come in multiple configurations of inputs and outputs. In dual channel configuration, the multiplexing transmit/receive device has two inputs and two outputs. This will allow an intelligent appliance to sequentially or simultaneously be addressed by the Intellikeyboard for either sequential or simultaneous output. Similarly, this same block diagram concept is executable for a Central multichannel multiplexing transmit/receive device.

Referring now to FIGS. 3, 4, 5, and 6, the following examples serve to demonstrate the workings of the Intellikeyboard, intelligent appliances, and the central multichannel multiplexing transmitter/receiver:

EXAMPLE 1

A telephone call may be initiated or received using the Intellikeyboard. A user may activate the Intellikeyboard and put it into the telephony mode. Immediately, the Intellikeyboard is in RF communication with the central multichannel multiplexing transmitter/receiver located in the local area network. The central multichannel multiplexing transmitter/receiver will connect with the outside line and complete the connection. Let us say at some point in the conversation the capability of the local server or network server is desired. The Intellikeyboard can send a RF command to the central multichannel multiplexing transmitter/receiver to bring the server on-line and into the communication loop. The server may be used to record the conversation or to have the conversation translated into another language using the extensive language translation capabilities resident on the local/network server. Conversations could be conducted in two or more languages.

EXAMPLE 2

If at any time during the conversation a print out is desired an intelligent printer can be activated by the Intellikeyboard to initiate and execute the job. This is accomplished by sending an RF signal from the Intellikeyboard to the intelligent printer via the central multichannel multiplexing transmitter/receiver. The intelligent printer is now in the loop and is executing the tasks immediately or queuing and scheduling the task.

EXAMPLE 3

The text, graphics, and video may be activated by the Intellikeyboard and viewed on a built-in screen or viewed on an intelligent TV screen by patching, the intelligent TV screen into the communication loop.

EXAMPLE 4

Multichannel capability and the ability to multiplex the inputs/outputs sequentially or simultaneously for use by a number of intelligent appliances is possible. This multichannel multiplexing capability may exist within each intelligent appliance. The ability to incorporate this feature is driven by need and cost. The advantage is that this feature allows each intelligent appliance and the whole local area network to be used efficiently and effectively by allowing queuing and scheduling of various tasks. The queuing and scheduling tasks is real time and there may be different levels of queuing and scheduling capabilities resident in each intelligent appliance and the local area network.

Certain levels of queuing and scheduling capabilities may exist in the intelligent appliance, another level of capabilities may exist in the central multichannel multiplexing transmitter/receiver and yet another level of capability may exist in the local or network server. The level of capability to queue, schedule, process, receive, and transmit data depends on the number of input and output channels, the size of the data buffer and whether the inputs and outputs can be multiplexed. It is also possible to define and dedicate certain channels for various pre-defined or programmable tasks only. The embedded transmitter/receiver function and the central multichannel multiplexing transmitter/receiver can be built to have a combination of various input and output channels with and without multiplexing capability. The basic concept of how these electronic functional blocks can be executed at either the board level or chip level is described. As an example, a quad in quad out transmitter/receiver can have one channel dedicated for telephony, another channel dedicated for TV, another channel for printers, and a channel for security or it is possible to have certain channel multiplexed for use by a number of intelligent appliances.

EXAMPLE 5

The transmission/lreception is within the FCC prescribed frequency domain for intelligent appliances. The transmitter/receiver electronics and ICs are designed to conform to the prescribed standards. However, within the local or wide area network significant RF traffic from numerous intelligent appliances may be present with the potential for crosstalk and other problems. To avoid this crosstalk, packets of RF data sent by each intelligent appliance are coded and transmitted in such a way that periodically there will be an identifying string of data that clearly defines the source of the data and the destination. The periodicity of this identifying string data, the length and complexity of this identifying string data, and the encryption of actual data is driven by the level of accuracy and the level of security desired. This ability to encode and decode identifying strings from each appliance allows multiple intelligent appliances to use the same RF frequency domain and co-exist within a local area network. The implementation of this concept requires the hardware described and a pre-defined set of software protocols that may be either industry standard or custom.

EXAMPLE 6

The central multichannel multiplexing transmitter/receiver may either connect with the outside world through the wire or by wireless or satellite means. It is possible that this central multichannel multiplexing transmitter/receiver may communicate in one defined frequency domain within the local or wide area network with all intelligent appliances that are part of this network and at a same or different frequency domain with the outside world. By extension the reverse concept is also claimed. In this scenario, where there may be a need for two different frequencies of communication the transmitter/receiver electronics and chip level solutions can be designed to accommodate for this requirement.

EXAMPLE 7

Referring now to FIG. 7, the figure consists of an intelligent electrical outlet with a built in radio frequency controller. The radio frequency controller has the ability to receive inputs and transmit Output such that the electrical outlet can be controlled by the Intellikeyboard or other means. The radio frequency controller consists of the transmit/receive function and the control function which includes the ability to turn the outlet on and off and perform other variable and programmable control functions. The radio frequency controller consists of a receiver, a processor, controller, programmable logic, and a transmitter. The radio frequency controller electronics may be implemented by those skilled in the art using, either standard or custom electronics. The entire controller electronics may be implemented as a monolithic single chip integrated circuit. A block diagram concept of how this embedded RF controller can be implemented at a chip level is shown in FIG. 7. The radio frequency controller can be incorporated on all new electrical outlets and switches to be made in the future such that they are all intelligent electronic outlets and intelligent electrical switches. Alternatively, a plug in module may be configured to make existing electrical outlets and electrical switches intelligent. Additionally, this concept of an embedded RF controller may be extended to other sensors that would sense such things as light, temperature, and pressure, smoke, to name a few. The radio frequency controller consists of the transmit/receive function and the control function which includes the ability to turn the switch on and off. It is possible to assign a unique identification to each electrical outlet and each electrical switch to uniquely address and control these units using the Intellikeyboard.

Further more detailed examples of the aspects of the present invention will now be described.

EXAMPLE 8

Figure 8:
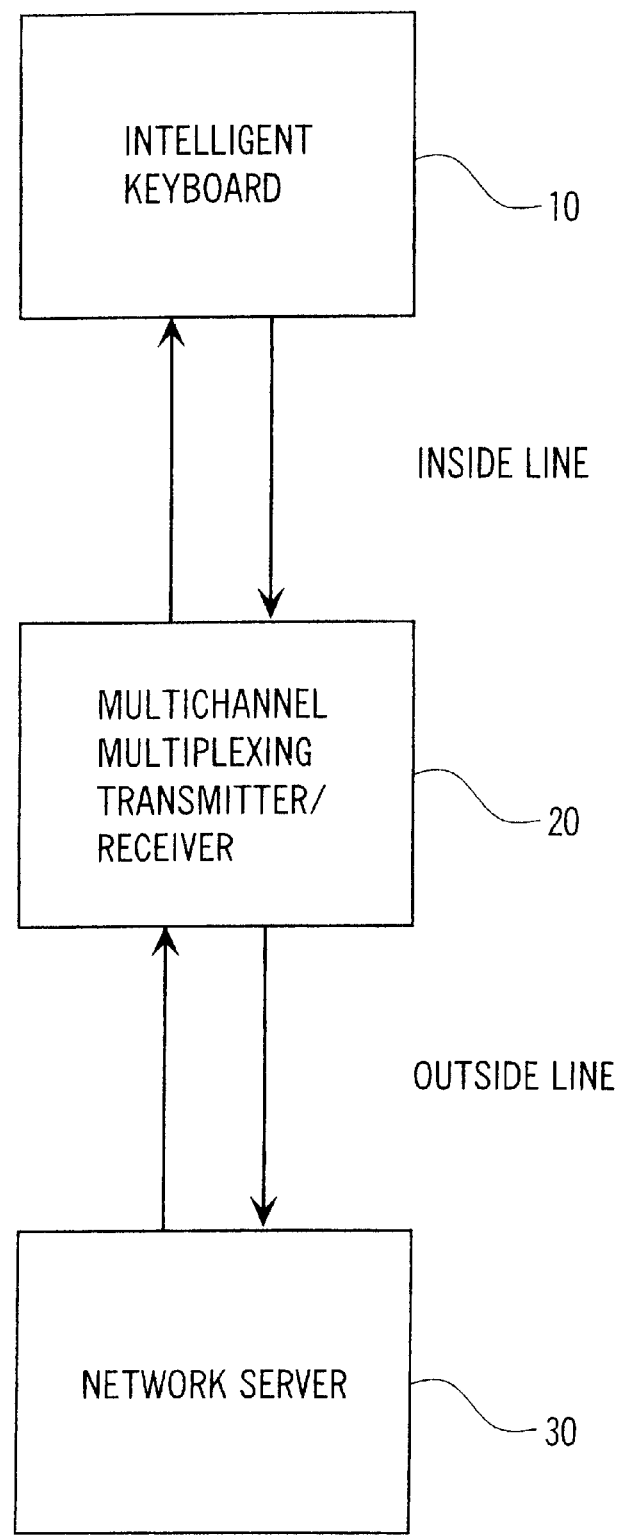

FIG. 8 consists of three distinct blocks, Block 1 being the Intellikeyboard block, Block 2 being the Multichannel Multiplexing Transmitter/Receiver, and Block 3 being the Network Server, all connected by wired or wireless means.

This example describes the use of the Intellikeyboard in the telephony mode. Telephony for voice or data transmission may be initiated by selecting the telephony mode on the Intellikeyboard. This may be activated by voice or key command.

The telephony connection maybe wired or wireless. The connection is completed between the Intellikeyboard and the Central Multichannel Multiplexing Transmit/Receiver located in the loop. The Trasmitter/Receiver in turn establishes a connection to an outside line for either dialup or Internet access. In this mode, two-way voice or data transmission may be conducted. In addition, specific advance use of language translation capability may be brought online by connecting to a network server on which resides an extensive database capability to translate from one language to another by recognizing the speech patterns of either speaker. Using this database capability the network server is able to provide speech in any selected language at either end. As an example, a speaker conversing in English at one end may have his speech translated to Japanese at the other end. Similarly, the reverse translation can be performed. The server could record the conversations if desired by selecting a record feature.

EXAMPLE 9

Figure 9:
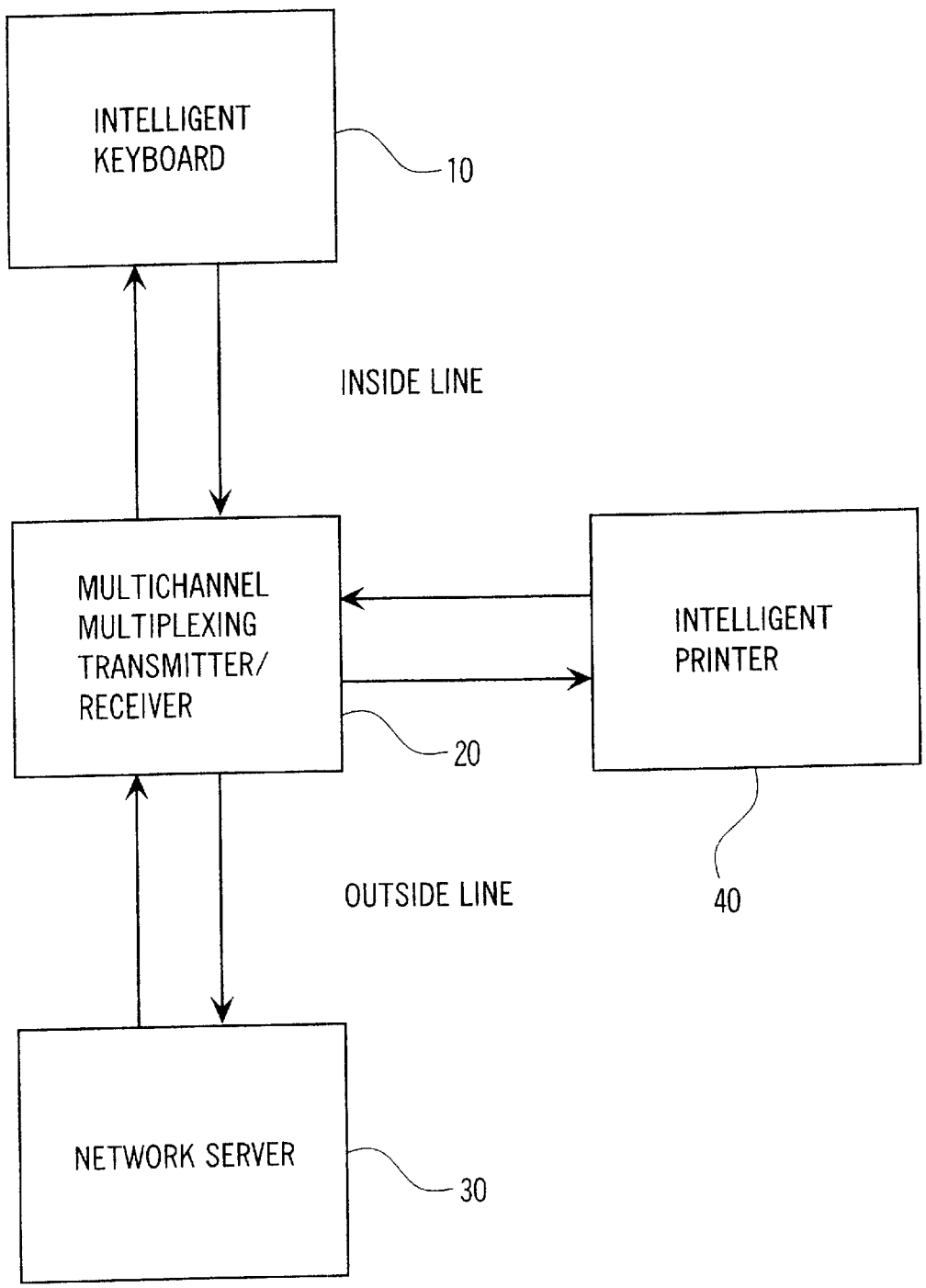

FIG. 9 consists of four distinct blocks, Block 1 being the Intellikeyboard block, Block 2 being the Multichannel Multiplexing Transmitter/Receiver, Block 3 being the Network Server, and Block 4 being an Intelligent Printer, all connected by wired or wireless means.

In this example, a textual transcript of any telephonic conversations could be generated in any selected language using the extensive mapping capabilities for language translation resident on the network server. These features would provide real-time voice translation and transcription capabilities. The text may be printed at either end in a desired language using an Intelligent Printer. Once the Intelligent Printer is part of the loop, it may execute tasks immediately or queue and/or schedule the tasks.

EXAMPLE 10

Figure 10:
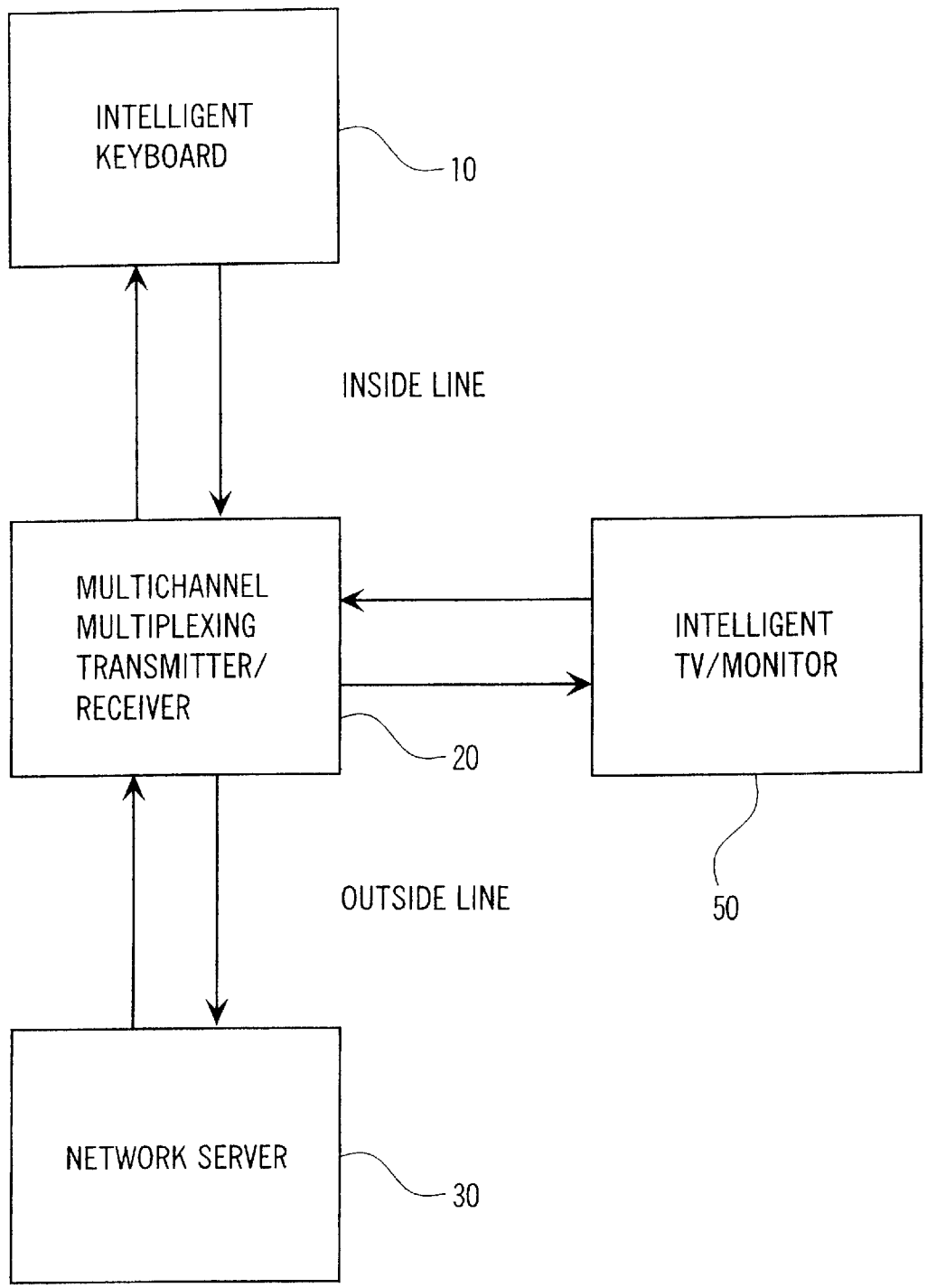

FIG. 10 consists of four distinct blocks, Block 1 being the Intellikeyboard block, Block 2 being the Multichannel Multiplexing Transmitter/Receiver, Block 3 being the Network Server, and Block 6 being an Intelligent TV/Monitor, all connected by wired or wireless means.

The text, graphics, and video may be activated by the Intellikeyboard and viewed on a built-in screen or viewed on an intelligent TV/monitor screen by patching the intelligent TV/monitor screen into the communication loop.

EXAMPLE 11

Figure 11:
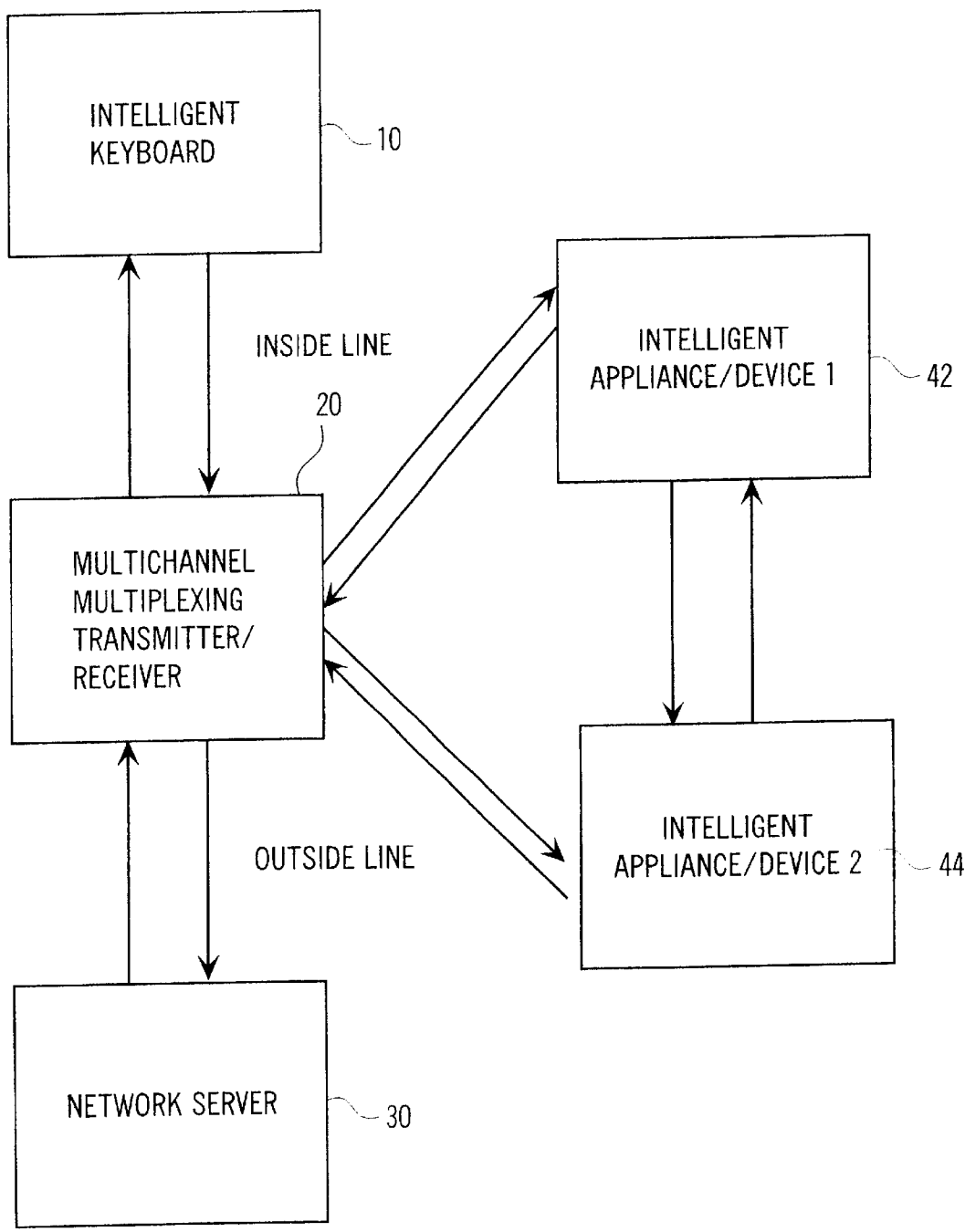

FIG. 11 consists of five distinct blocks, Block 1 being the Intellikeyboard block, Block 2 being the Multichannel Multiplexing Transmitter/Receiver, Block 3 being the Network Server, Block 8 being an Intelligent Appliance, and Block 10 being another Intelligent Appliance, all connected by wired or wireless means.

Multichannel capability and the ability to multiplex the inputs/outputs sequentially or simultaneously for use by a number of intelligent appliances is possible. This multichannel multiplexing capability may exist within each intelligent appliance. The ability to incorporate this feature is drive by need and cost. The advantage is that this feature allows each intelligent appliance and the whole local area network to be used efficiently and effectively by allowing queuing and scheduling of various tasks. The queuing and scheduling tasks is real time and there may be different levels of queuing and scheduling capabilities resident in each intelligent appliance and the local area network.

Certain levels of queuing and scheduling capabilities may exist in the intelligent appliance, another level of capabilities may exist in the central multichannel multiplexing transmitter/receiver and yet another level of capability may exist in the local or network server. The level of capability to queue, schedule, process, receive, and transmit data depends on the number of input and output channels, the size of the data buffer, and whether the inputs and outputs can be multiplexed.

It is also possible to define an embedded transmitter/receiver function and the central multichannel multiplexing channels with and without multiplexing capability. The basic concept of how these electronic functional blocks can be executed at either the board level or chip level is described. As an example, a quad-in and quad-out transmitter/receiver can have one channel dedicated for telephony, another channel dedicated for TV, another channel for printers, and a channel for security. As an option, specific channels may be multiplexed for use by a number of intelligent appliances.

In specific, referring to FIG. 11, the Multichannel Multiplexing Transmitter/Receiver is described with four channels, one channel being dedicated for two-way communication with the Intellikeyboard, another channel dedicated for two-way communication with the network server, and two other channels each dedicated for two communication with two different Intelligent Appliances. In this quad configuration, the Multichannel Multiplexing Transmitter/Receiver can interact with four different entities having the capability to schedule or process the data real time. Similarly, each of the Intelligent Appliances may have some built-in capabilities for communication directly with the Intellikeyboard or through the Multichannel Multiplexing Transmitter/Receiver.

EXAMPLE 12

Once again referring to FIG. 11, it is possible for a unique identification to be assigned to each Intelligent Appliance to maintain communication protocols. Intelligent Appliance 1 would have a specific beginning and ending code that uniquely identifies it. Whenever data is received by the Intelligent Keyboard or any other device on the network it would be able to identify the source. If Intelligent Appliance 1 has transmitted certain data the Intelligent Keyboard would identify the source or the Multichannel Multiplexing Transmitter/Receiver could queue or transmit the data to the uniquely designated appliance.

The wireless transmission/reception is within the FCC prescribed frequency domain for intelligent appliances. The wireless transmitter/receiver electronics and ICs are designed to conform to the prescribed standards. However, within the local or wide area network significant RF traffic from numerous intelligent appliances may be present with the potential for crosstalk and other problems. To avoid this crosstalk, packets of RF data sent by each intelligent appliances are coded and transmitted in such a way that periodically there will be an identifying string of data that clearly defines the source of the data and the destination. The periodicity of this identifying string data, the length and complexity of this identifying string data, and the encryption of actual data is driven by the level of accuracy and the level of security desired. This ability to encode and decode identifying strings from each appliance allows multiple intelligent appliances to use the same RF frequency domain and co-exist within a local area network. The implementation of this concept requires the hardware described and a pre-defined set of software protocols that may be either industry standard or custom.

EXAMPLE 13

Figure 12:
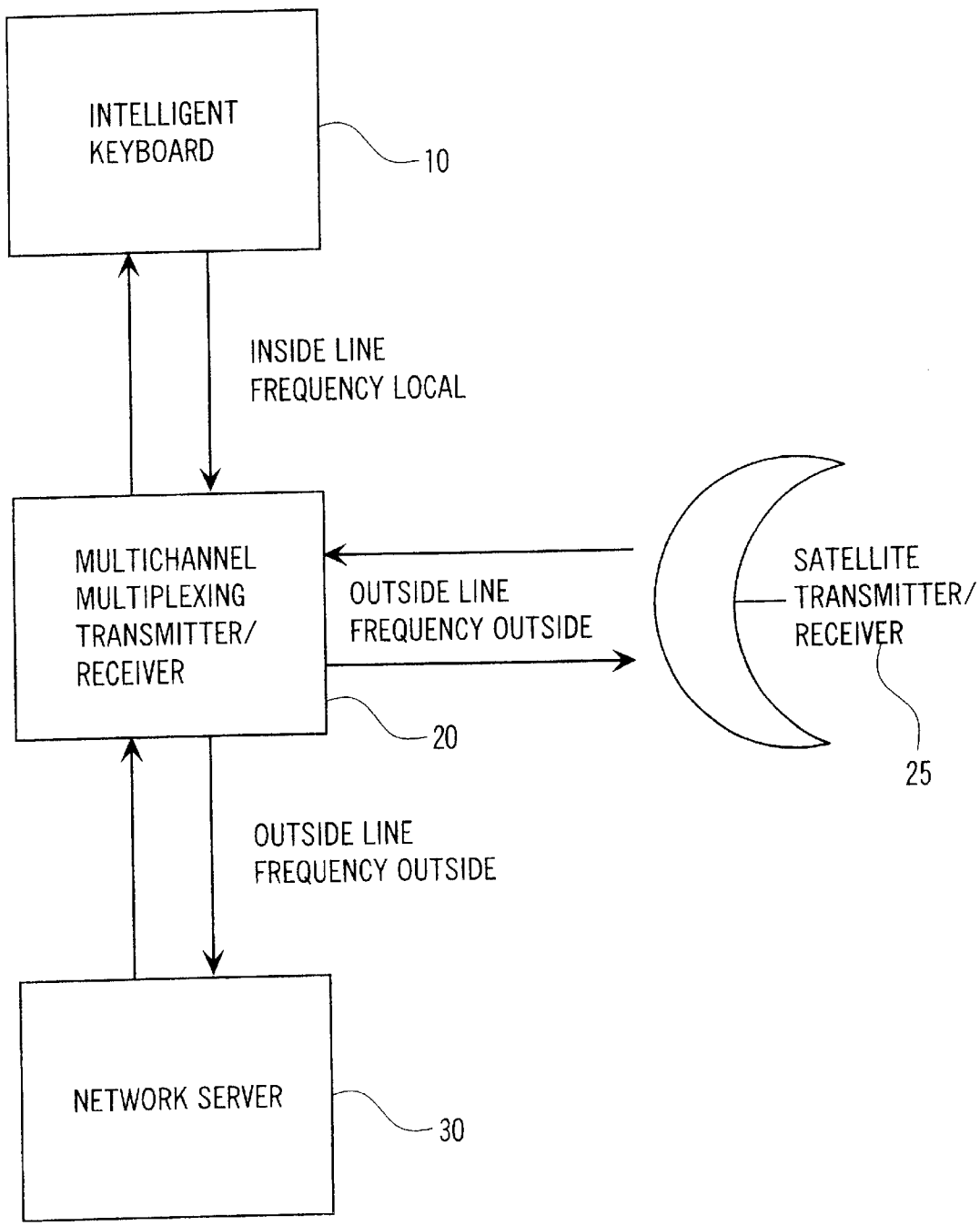

Referring to FIG. 12 which shows a block diagram of intelligent devices communicating within the network at a specific frequency of $F_{local}$ and with the outside world via satellite transmitter receiver 12 at a different frequency of $F_{outside}$.

The central Multichannel Multiplexing Transmitter/Receiver may either connect with the outside world through the wire or by wireless or satellite means. It is possible that this central Multichannel Multiplexing Transmitter/Receiver may communicate in one defined frequency domain within the local or wide area network with all Intelligent Appliances that are part of this network and at same or different frequency domain with the outside world. By extension the reverse concept is also claimed. In this scenario, where there may be a need for two different frequencies of communication the transmitter/receiver electronics and chip level solutions can be designed to accommodate for this multiple frequency requirement.

EXAMPLE 14

Referring now to FIG. 7, the figure consists of an intelligent electrical outlet with a built-in radio frequency controller. The radio frequency controller has the ability to receive inputs and transmit output such that the electrical outlet can be controlled by the Intellikeyboard or other means. The radio frequency controller consists of the transmit/receive function and the control function including the ability to turn the outlet on and off and perform other variable and programmable control functions. The radio frequency controller consists of a receiver, a processor, controller, programmable logic, and a transmitter. The radio frequency controller electronics may be implemented by those skilled in the art using either standard or custom electronics. The entire controller electronics may be implemented as a monolithic single chip integrated circuit A block diagram concept of how this embedded RF controller can be implemented at a chip level is shown in FIG. 7. The radio frequency controller can be incorporated on all new electrical outlets and switches to be made in the future such that they are all intelligent electronic outlets and intelligent electrical switches. Alternatively, a plug in module may be configured to make existing electrical outlets and electrical switches intelligent. Additionally, this concept of an embedded RF controller may e extended to other sensors that would sense such things as light, temperature, and pressure, smoke, to name a few. The radio frequency controller consists of the transmit/receive function and the control function including as a minimum, the ability to turn the switch on and off. It is possible to assign a unique identification to each electrical outlet and each electrical switch to uniquely address and control these units using the Intellikeyboard.

Thus, while the invention has been described with reference to specific embodiments and applications, the description is illustrative of the invention and is not to be construed as limiting the invention. Various modifications and applications may occur to those skilled in the art without departing from the true spirit and scope of the invention as defined by the appended claims.

1. A keyboard, hereafter called the Intellikeyboard, that has the ability to communicate with other intelligent devices and appliances through either wired or wireless means. The Intellikeyboard system configuration combines the standard keyboard functions, display functions, transmit and receive functions, telephony functions, fax and scan functions, voice and speech recognition functions, in addition to serving as a universal command and control unit for appliances and devices that operate using electrical power.

2. The system level configuration for the command and control of multiple intelligent appliances utilizing the Intellikeyboard, an embedded transmit/receive function that would exist within each intelligent appliance or device, and a Central multichannel multiplexing transmit/receive device that would be part of a local or wide area networkwithin the home or office. A board level, multichip single package and/or single chip monolithic integrated circuit implementation of the embedded transmit/receive function and the central multichannel multiplexing function is also claimed.

The Central multichannel multiplexing transmit/receive device is capable of multiplexing inputs/outputs from a number of intelligent appliances/devices and communicating via the built in transmit/receive function across various communication paths and/or lines.

3. The system level configuration where the Intellikeyboard and the Central multichannel multiplexing transmit/receive device can work in tandem with a local or network server to perform various computing, data processing, and data transmission functions, inclusive of text, graphics, audio, and video.

4. The basic Intellikeyboard has the electronics and computing power to transmit data to and receive data from either a network or local server, which may be a personal computer, or intelligent peripheral or intelligent appliance through either wired or wireless means. Thus the basic Intellikeyboard serves as a transmit and receive hub. Using the computing power resident on the local or network server or other intelligent devices a user can perform all standard computing functions from the Intellikeyboard.

5. The Intellikeyboard is a device with a speaker and is capable facilitating interaction between voice recognition software resident on the network server, local server, or on the intelligent appliance and the Intellikeyboard. Intellikeyboard is capable of outputting sound. It is also able to convert sound to data that can be transmitted to a local or network server.

6. Intellikeyboard may have a built in display or operate with an external display. This Intellikeyboard is capable of displaying data being sent to or received from the local or network server or other intelligent appliances. This display is capable of showing text, graphics or other data.

7. Intellikeyboard has a transmitter, receiver, a digital signal processor, controller, and display electronics and audio electronics which may be implemented with standard or custom components by those knowledgeable in the art. By using the voice recognition software resident on the local or network server, Intellikeyboard can convert text data into voice and broadcast voice through a speaker mechanism.

8. There can be a transmit/receive functional block built into the Intellikeyboard. The Intellikeyboard can operate through either wired or wireless means.

9. The Intellikeyboard need not have an operating system, but is capable of operating, with a built in operating system or an operating system resident on a local or network server or other intelligent devices.

10. The Intellikeyboard is capable of transmitting inputs from either the keypad, display or voice inputs picked up from the microphone to the local server or network server or intelligent peripheral or intelligent appliance for processing, through either wired or wireless means. Voice includes spoken as well as other audio and/or audible tones inclusive of music/sound. Thus one may either send data to software resident on the local server or network server or intelligent peripheral or intelligent appliance through the keypad on the Intellikeyboard, through voice commands, through the display by touching the screen, through a pen which interacts with the display, or through another device which interfaces with the Intellikeyboard.

11. Intellikeyboard is capable of taking input and output through a transmit/receive functional block, a telephone line, an ethernet line or other form of data communication. These inputs and outputs are then processed by a local or network server and are relayed back to Intellikeyboard and/or the display.

12. Intellikeyboard can be hooked to a local area network or wide area network, including, the Internet, through either wired or wireless means, to receive inputs of text and/or voice and to send outputs of text or voice depending on the user's choice. Voice sent to a local or network server could be stored as a data file. Voice may be in any language since the Intellikeyboard leverages the language capabilities of the local or network server.

13. Intellikeyboard may also work in tandem with a local or network server to receive text or voice data and process these inputs for audio output. The primary computing power/protocols and software reside on the server.

14. The Intellikeyboard is capable of interacting and commanding many intelligent peripheral devices around the home or office through either wired or wireless means and thus is a universal keyboard. By using the processing power of the local or network server, the Intellikeyboard can assign/reassign an identification number to each peripheral or appliance. With this unique identification number and the processing capability of the local or network server, the Intellikeyboard can then control that particular intelligent appliance or other peripheral devices. The intelligent appliances will have programmation capability to set or change identification and encryption. This programmation capability can be easily accessed and controlled by the Intellikeyboard. This will allow the Intellikeyboard to re-configure various intelligent appliance as needed by the user. All the appliances and peripherals will subscribe to the same protocols such that they will be able to communicate to each other and execute instructions. A user may also use the programmation capability of the Intellikeyboard to assign a password or other security measure(s) such as data encryption to a particular intelligent appliance. Thus, unauthorized control of intelligent devices will be prevented.

15. The Intellikeyboard can use its transmit/receive device to transmit data to and receive data from a local or network-server or intelligent peripheral or appliance through either wired or wireless means. In this scenario, the local or network server will perform any computation that is necessary. The transmit/receive can be either single or multichannel. This means that the transmit/receive device which is built in to the Intellikeyboard can receive all of its input from the Intellikeyboard or it can receive many different inputs from various intelligent appliances and peripherals simultaneously or sequentially.

16. Other features and options may be added to the Intellikeyboard. For example, the Intellikeyboard can possess more processing power such that it can perform basic computations and will not have to directly communicate with the local or network server to perform certain functions. For example, Intellikeyboard may possess more processing power so that it can assign an identification number to various appliances and peripherals, recognize various appliances and peripherals and so that it can assign instructions for these appliances and peripherals to execute. Other features such as data storage can be added to the Intellikeyboard. A module or storage device can be built in to the Intellikeyboard to record and store data and voice. For example, this can be accomplished by using a PCMCIA card. Intellikeyboard can be connected to a mouse, electronic pen, CD-ROM, printer, CRT/TV by either wired or wireless means. As an option a scanner may interface with the Intellikeyboard so that documents can then be sent to the local or network server for further processing. Another option is to enable a printer to interface with the Intellikeyboard to print data locally.

17. The transmit/receive controller electronics block diagram, as shown in FIG. 6, can be implemented by those skilled in the art with either standard or custom electronics. The entire controller electronics may be a single chip integrated circuit. It is anticipated that all intelligent appliances would utilize this block diagram as a universal and requisite embedded feature. As described in FIG. 6, this embedded transmit/receive function may come in multiple configurations of inputs and outputs. In dual channel configuration, the multiplexing transmit/receive device has two inputs and two outputs. This will allow an intelligent appliance to sequentially or simultaneously be addressed by the Intellikeyboard for either sequential or simultaneous output. In addition, it is possible for the multichannel multiplexing transmit/receive function to be incorporated on a mother board or a daughter board of a personal computer, server, or other computing/processing device.

18. The Intellikeyboard, the multiplexing transmit/receive device, and the system configuration and protocols described in this invention allow the Intellikeyboard to fully serve as a universal command and control module. As an example, the Intellikeyboard can serve as a telephone. As another example, the Intellikeyboard can turn lights on and off in a particular location of a house. As another example, the Intellikeyboard can accept voice input and through the Intellikeyboard's use of the processing power of the local server or network server or other intelligent device, the Intellikeyboard can convert this voice into text for printing by an intelligent printer. As another example, the Intellikeyboard may interact with a diversity of electronic equipment, such as garage doors, security systems, printers, televisions, washing machines, ovens, stove tops, personal computers, and other electronic devices. The Intellikeyboard can have its own antenna.

19. The Intellikeyboard may have a keyboard configuration that provides either a partial or a full function keyboard which can be folded or collapsed to achieve a compact size and portability. The optional display, which may be built in or external to the Intellikeyboard, may also be folded or collapsed to achieve a compact size and portability. The Intellikeyboard, unlike a personal digital assistant or handheld PC, need not have large computing and processing power built in to it since it leverages its basic communication capabilities with the processing and computing power resident on the local or network server or other intelligent devices.

20. The Intellikeyboard can command and control each and every electrical outlet or switch through either wired or wireless means. Refer to FIG. 7. Each electrical outlet and/or switch may be configured to have a radio frequency transmit/receive controller and associated electronics built in to it which would enable the Intellikeyboard to communicate and control each outlet and switch. The electrical outlet may have its own antenna or it may use the wiring of the house as its antenna for communication with the Intellikeyboard and/or other devices. This can be accomplished by having a unique identification number for each outlet and switch which can be programmed by the user. The Intellikeyboard not only addresses, commands, and controls intelligent appliances and devices but it can also interface with each electrical outlet, electrical switch, and sensors thereby controlling appliances and devices that may traditionally not have had these intelligent functions built in.

What is claimed is:

1. An intelligent keyboard system comprising:
    an intelligent keyboard having central portable compute, command and control functions for voice and data information;
    a network server unit;
    a multichannel multiplexing transmitter/receiver unit for communicating voice or data information between the intelligent keyboard and the network server unit via an inside line path and an outside line path, respectively.

2. An intelligent keyboard system comprising:
    an intelligent keyboard having central portable compute, command and control functions;
    a network server unit;
    a multichannel multiplexing transmitter/receiver unit for communicating between the intelligent keyboard and the network server unit.

3. A method for using an intelligent keyboard system to enable communication and control between a peripheral device and a network server comprising the steps of:
    providing an intelligent keyboard;
    assigning a unique identification number to the peripheral device;
    communicating a command between the network server and the intelligent keyboard, together with the identification number;
    relaying the command between the intelligent keyboard and the peripheral device with that identification number so that communication of the command between the network server and the peripheral device is enabled.

4. The method of claim 3 with communication between the peripheral device and the intelligent keyboard and communication between the intelligent keyboard and another peripheral device so that communication between peripheral devices is enabled.

5. An intelligent keyboard system comprising:
    an intelligent keyboard, the keyboard including a display for displaying text and graphics;
    a network server;
    means for communicating between the network server and the intelligent keyboard;
    the intelligent keyboard providing text and graphics from and to the network server.

6. The intelligent keyboard system of claim 5 wherein text is input and output by audible means from interpreting and synthesizing means within the intelligent keyboard.

7. The intelligent keyboard system of claim 5 including a touch screen input.

* * * * *